Patented Apr. 10, 1951

2,548,646

UNITED STATES PATENT OFFICE 2,548,646

MOLDPROOFING MINERAL COATED PAPERS

John A. Bicknell, Westbrook, and Stanley J. Johnson, Portland, Maine, assignors to S. D. Warren Company, Boston, Mass., a corporation of Massachusetts No Drawing. Application January 2, 1946, Serial No. 638,710

3 Claims. (Cl. 106—15)

This invention relates to mold-proofing mineral coated papers, and is particularly concerned with the mold-proofing of coated papers carrying a coating of a mineral pigment—which latter term as used herein specifically includes finely divided metal—and a water-dispersible proteinous adhesive—specifically casein.

The protective treatment with which the present invention is concerned is variously referred to in U. S. Government specifications as mold-proofing and mildew-proofing (see Corps of Eng. Tentative Specification #T-2400, paragraph F-3d), and according to said specifications is measured in terms of growth of the organism "*Aspergillus niger*" in and on the treated paper product.

It is an object of the present invention to provide a mineral coated paper, wherein the adhesive component is or consists largely of a water-dispersible proteinous substance, which coated paper product is resistant to the development of mold. A further inventive object is the provision of a coated paper, of the character just mentioned, in which the mold-proofing or mold-resisting component is water-insoluble or at least very poorly soluble in water and hence is retained in the paper product when the latter is immersed in water for several hours. Another and particular inventive object is to mold-proof metallic papers in which the finely divided pigmentary component is bound to the paper sheet by means of casein.

It has now been found that mold-proof or mold-resisting properties—not removed by soaking in water—can be conferred upon mineral coated papers carrying proteinous or amylaceous adhesive or polyvinyl alcohol adhesive by dispersing in the fluid mineral coating composition therefor a suitable amount of water-soluble salt of pentachlorophenol, or solution of pentachlorophenol in an organic solvent therefor, and thereupon precipitating the pentachlorophenol as a water-insoluble or difficultly soluble form thereof enjoying the mold-proofing or mold-resisting characteristics of the parent substance but not readily leachable from the final paper product, coating the resulting modified mineral coating composition onto the paper web, and drying and after-processing the coated paper in conventional manner.

Example 1

Into 250 parts of an aqueous suspension of clay and alkali (ammonia)-solubilized casein, containing per 100 parts of the suspension about 40 parts of clay and about 4.5 parts of casein, there was dissolved 1 part of sodium salt of pentachlorophenol. Thereafter, the composition was made acid by the incorporation thereinto of 2 parts of a 40% solution of formaldehyde. A water-insoluble derivative (of unknown identity) of the pentachlorophenol compound was formed, which water-insoluble compound was stably dispersed throughout the composition.

A conventional bodystock was coated, one side, with the resulting composition in quantity sufficient to add about 14 pounds per ream, dry weight, to the bodystock, and the coated product was dried and calendered in conventional manner.

The resulting mineral coated paper was found by appropriate known tests to have desirable mold-resisting properties which properties were not materially depreciated. However, an aluminum-casein coating composition was successfully modified as to mold-resisting properties by reacting casein per se, in aqueous medium, with sodium salt of pentachlorophenol in a substantial amount materially less than that necessary for solubilizing the casein, digesting the resulting reaction mixture with an alkaline-acting alkali metal compound such as sodium pyrophosphate, and incorporating aluminum flake in the resulting stable dispersion. This procedure is more fully described in the following specific example.

Example 2

Casein in aqueous medium was treated with sodium salt of pentachlorophenol in the proportions 17 grams of the latter and 100 grams of the casein per 1 liter of water. It was found that at higher concentrations the reaction product "set up" as a stiff rubber-like gel when cooled to room temperature, indicating or suggesting the presence of a resinification or chain reaction product. Sodium pyrophosphate in an amount by weight equal to about one-twentieth that of the casein thereupon was incorporated into the reaction mixture, and aluminum flake (previously wetted out with an appropriate wetting agent) was stirred in, in an amount to give a 4 to 1 ratio of aluminum to casein, and the mixture was diluted with water to approximately 20% solids content.

The resulting diluted mixture was applied to and evenly spread as a thin film over one side of a sized body stock, in amount sufficient to add about 10 pounds per ream, dry weight, to the latter, and the coated paper was dried and supercalendered. The positive mold-resisting properties of the resulting aluminum coated paper product were not materially depreciated by prolonged soaking of the product in water.

An aluminum coated paper product admirably simulating aluminum foil and having very desirable mold-resisting properties may be prepared in accordance with the principles of the following example.

*Example 3*

A 50 pound bodystock was coated, one side, with the clay-casein coating composition described in Example 1, in an amount sufficient to add 12 pounds dry weight thereto. Thereafter, there was applied to, and evenly spread by air brush over, the clay-casein coated surface, in an amount sufficient to add 2 pounds dry weight, a top coating prepared as described in Example 2 above except that with the sodium pyrophosphate there had been used also urea in a 1 to 4 ratio with respect to the weight of casein employed. The resulting aluminum-coated paper product was, after drying, supercalendered to confer thereupon a high reflectivity (85) and correspondingly low heat emissivity. The so-prepared mold-proofed product was useful as heat-insulating material, and the mold-proofness was substantially retained after prolonged contact of the paper with water.

It is to be understood that the paper base per se desirably should be fungus-resistant, and that resistance to fungus growth may be provided in known manner by adding sodium pentachlorophenol to the furnish and precipitating pentachlorophenol by addition of alum. Alum cannot be used in the coating compositions, however.

In lieu of using a soluable salt (e. g., the sodium salt) of pentachlorophenol in preparing the aqueous mineral coating composition, one can incorporate into the latter, with good agitation, a solution of pentachlorophenol in an organic solvent such for example as ethanol, propanol or butanol, and thereupon precipitate the pentachlorophenol upon the solids content of the composition. Thus, we have found it satisfactory to dissolve said agent in ethanol and to add the solution, under good agitation, to an otherwise completed coating mixture: the agent is precipitated on the solids of the mixture as the alcohol is diluted by the water of the mixture. And, we have found that the agent satisfactorily can be dispersed in a coating composition comprising aluminum flake by dissolving the agent in butanol (a 25% solution being operable) and using the resulting solution for wetting the aluminum flake preliminary to incorporating the latter into the aqueous dispersion of the adhesive: incorporation into the aqueous dispersion results in precipitation of the pentachlorophenol throughout the mixture.

The aforesaid agent functions whether the adhesive be casein or a vegetable protein or starch or dextrin or polyvinyl alcohol, but is not a solvent for polyvinyl alcohol or the amylaceous adhesive. Where the adhesive employed is relatively water-soluble, it is desirable to after-treat the coated product in known manner to improve the water resistance of the coating.

It is to be understood that any and all of the coated paper products of Examples 1 to 3 above may be machine calendered or supercalendered and/or buffed as desired. It also is to be understood that instead of, or in addition to, the clay of Examples 1 and 3 there may be employed any other conventional mineral component of a water-borne mineral coating composition for paper, e. g., blanc fixe, finely divided calcium carbonate, satin white, titanium dioxide, or the like.

We claim:

1. Process which comprises mixing with casein in aqueous medium sodium salt of pentachlorophenol and sodium pyrophosphate, in amounts individually insufficient to solubilize the casein but sufficient in toto to form a uniform stable dispersion of casein in water, the sodium pyrophosphate content being about 5% by weight of the casein content, and thereafter dispersing aluminum flake therein to yield a paper coating composition.

2. Process which comprises mixing with casein in aqueous medium sodium salt of pentachlorophenol and sodium pyrophosphate, in amounts individually insufficient to solubilize the casein but sufficient in toto to form a uniform stable dispersion of casein in water, the sodium pyrophosphate content being about 5% by weight of the casein content.

3. Process which comprises mixing with casein in aqueous medium sodium salt of pentachlorophenol, sodium pyrophosphate and urea, in amounts individually insufficient to solubilize the casein but sufficient in toto to form a uniform stable dispersion of casein in water, the sodium pyrophosphate content being about 5% by weight of the casein content and the urea content being about 25% by weight of the casein content, and thereafter dispersing aluminum flake therein to yield a paper coating composition.

JOHN A. BICKNELL.
STANLEY J. JOHNSON.

REFERENCES CITED

The following references are of record in the file of this patent:

UNITED STATES PATENTS

| Number | Name | Date |
|---|---|---|
| 1,690,390 | Williams et al. | Nov. 6, 1928 |
| 2,288,810 | Leatherman | July 7, 1942 |
| 2,297,276 | Atwood | Sept. 29, 1942 |
| 2,362,884 | Clark | Nov. 14, 1944 |
| 2,430,017 | Houk | Nov. 4, 1947 |

FOREIGN PATENTS

| Number | Country | Date |
|---|---|---|
| 20,249 | Australia | Nov. 20, 1934 |
| 202,883 | Great Britain | Aug. 30, 1923 |
| 543,302 | Great Britain | Feb. 18, 1942 |

OTHER REFERENCES

Technical Bulletin No. 45, Dow Chem. Co., Dowicide Division (Use of Dowicides for Preparation of Mold-Resistant Paper Products), July 15, 1941, 4 pages.

Stringfellow: Article in American Dyestuff Reporter, May 27, 1940, pages 266–269.

Ciba Company, Inc., advertisement in American Dyestuff Reporter, vol. 32, No. 4, Feb. 15, 1943, page III.

Hadert: Casein and its Uses, page 49 (translation of 2nd German edition by Goldsmith), Chemical Publishing Co., N. Y., 1938.